Patented Apr. 3, 1951

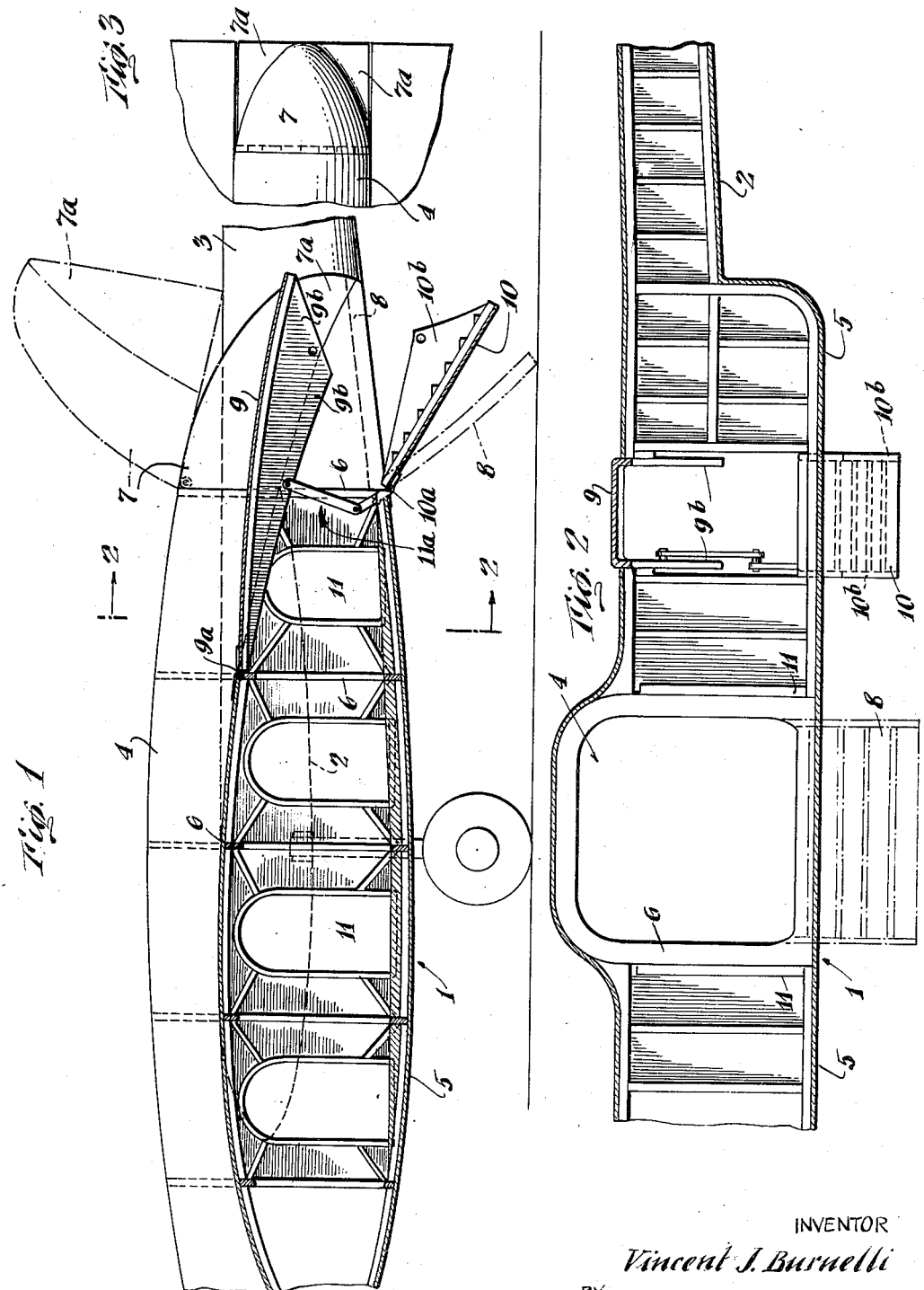

2,547,811

UNITED STATES PATENT OFFICE 2,547,811

REAR DOORWAY FOR AIRFOIL FUSELAGES

Vincent J. Burnelli, Red Bank, N. J.

Application September 25, 1945, Serial No. 618,465

3 Claims. (Cl. 244—118)

It is the purpose of this invention to provide improved means for cargo adaptation of the Burnelli type airplane covered by Patent No. 2,281,-673 which is devised for the portage of military equipment and in connection therewith to employ the feature of portal frame clearance through the central hatch section for bulky cargo in combination with improved means for the rapid rear loading of the airfoil fuselage section. Enlarged cargo design loading from the rear of the aircraft is of certain advantage and for this purpose the streamlined fairing of the hatch section is arranged to hinge and open upward, which fairing includes a section of the wing body airfoil trailing edge. The lower member of this structure provides a ramp which when closed serves as a part of the bottom cover of this section.

By combining a segment of the trailing edge of the airfoil body with the hatch fairing that forms the hinged door, a parallel space is provided for the entrance of the cargo to the main portal door opening which is of full width. This permits the hatch fairing to taper in plan view to a vertical edge for best streamlined effect.

A structural feature for the improved loading arrangement of this airfoil body hatch combination is the provision of portal frame openings in the central hatch section side walls that carry the shear loads of the structure, said portal doors permitting access to the wing body section for occupants or cargo. These portal frames are necessarily limited in height relative to the profile of the wing body section which is joined to the central cargo body, the hatch of the latter increasing the head room of this section for very bulky articles.

A main feature of the device is the improved rear loading means provided for the airfoil body section by arranging the trailing edge upper and lower surface members to be hinged rearward of the rear load carrying spar bulkhead said members opening through synchronized hinge action equal to the opened height of the main cabin section, with the lower member of the body trailing edge structure forming a ramp that extends to the ground for loading of cargo or occupants. The ramp and upper surface members are provided with side panels which serve for structural reinforcement of the hinged panels and which when opened in flight for the release of paratroops prevent excessive air disturbance at the point of outlet. When the ramp members are closed these side panels are concealed within the wing trailing edge, thus providing a rigid base for quick detachable locking means for the hinged members.

Other features and advantages of my invention will hereinafter appear.

In the drawing:

Figure 1 is a side view, partial, in side section, through an airplane of the Burnelli lifting fuselage type, whereof the fuselage is of two height dimensions, showing the respective rear opening means at the trailing edge portion for the central and side parts thereof, and showing the side portal means between the respective height portions of said fuselage.

Fig. 2 is a partial sectional view taken on the line 2—2 of Fig. 1, and

Fig. 3 is a detail, in top plan view, illustrating the central part of the upper hinged member of the trailing edge portion in conjunction with a segment of the main upper member of the trailing edge portion.

In said figures let 1 indicate the body of a Burnelli type lifting fuselage airplane, said body or fuselage having outspanned wings, to which one is shown in part at 2 (Fig. 2), and having empennage carrying booms, of which one is shown at 3.

The fuselage includes a longitudinal raised hatch 4, as in my earlier Patent No. 2,281,673, which increases the height of the central part of said fuselage, and is intended for the accommodation of more bulky objects, not capable of containment in the main or lateral portions 5 of the fuselage.

For rear loading purposes access is had through opening means at the trailing portion of the airfoil fuselage, as will be described hereinafter, and the fuselage interior is provided with bulkheads in the form of portal frames, as indicated at 6, and whose height is extended into the hatch 4.

Since the trailing edge portion of the airfoil fuselage tapers, in streamlined manner, said trailing edge portion is composed of an upper hinged member 7 and a lower hinged member 8, these members respectively being hinged to the rear portal bulkhead 6, and because the member 7 is hinged to said bulkhead at a point near the top of hatch 4, while member 8 is hinged near the bottom of the bulkhead, therefore when said members are swung wide open a clearance is provided capable of admitting objects of relatively considerable height.

As will be noted, in Fig. 3, the upper trailing edge member 7, which in part is the rear end of the hatch, is integral with a separated segment 7a of the main upper surface of the trailing edge portion, so that the parts 7, 7a can be raised as a unit to provide the desired head room.

In the main or normal side portions 5 of the airfoil fuselage where the head room is less than at the central or hatch portion, accommodation is provided for passengers, and, if used for troops capacious rear openings are provided for quick ingress and egress. Thus, these side portions are provided with an upper trailing portion member 9 and a lower trailing portion member 10, the member 9 being hinged to a portal bulk-head as at 9a and the lower member 10 being hinged to a portal member as at 10a. Also the members 9 and 10 are linked together, as by toggle arms 11a, thus enabling said members to open and close in unison. The members 9 and 10 are adapted to be swung open to provide an opening of a height equal to the height within these side portions of the airfoil fuselage. Also the member 10 is shown as provided with steps for ease in transit when said member is lowered. Furthermore, the members 9 and 10 are respectively provided with side panels 9b, 10b that when open serve as shields against air currents, and which when closed become ensheathed. In Fig. 2 of the drawings it is seen that the panels 9b are spaced from the adjacent walls to leave a space for receiving panels 10b when the door members are closed.

Variations within the spirit and scope of my invention are equally comprehended by the foregoing disclosure.

I claim:

1. In an all-wing airplane, a central airfoil body portion to contain the power plant and load, a height increasing hatch imposed longitudinally over the middle section of said body portion, reinforcing portal frames defining said middle section, said portal frames extending into said hatch, and upper and lower trailing edge door portions on said hatch and middle section, hinged, respectively, to the rearmost of said portal frames, said trailing edge portions forming a rear fairing door, that when open serves to admit and discharge cargo.

2. The subject matter of claim 1 wherein said rear fairing door forms an integral part of the wing body trailing edge to provide required height for entrance through said rearmost portal frame.

3. In an all-wing airplane, a central airfoil body portion to contain the power plant and load, a height increasing hatch imposed longitudinally over the middle section of said body portion, reinforcing portal frames defining said middle section, said portal frames extending into said hatch, and upper and lower trailing edge door portions on said hatch and middle section, hinged, respective to the rearmost of said portal frames, said trailing edge portions forming a rear fairing door that when open serves to admit and discharge cargo, and a portal frame provided in said central airfoil body portion laterally of said hatch, and upper and lower trailing edge members hingedly mounted on said portal frame for admitting and discharging cargo through the portal frame when the upper and lower trailing edge members are open, the lower member forming a ramp for loading from the ground, and means for connecting the upper and lower hinged members for unified opening and closing.

VINCENT J. BURNELLI.

REFERENCES CITED

The following references are of record in the file of this patent:

UNITED STATES PATENTS

| Number | Name | Date |
|---|---|---|
| 1,882,338 | Reed et al. | Oct. 11, 1932 |
| 2,095,440 | Hojnowski | Oct. 12, 1937 |
| 2,281,673 | Burnelli | May 5, 1942 |
| 2,315,117 | Freytag | Mar. 30, 1943 |
| 2,323,279 | Van Zelm | June 29, 1943 |
| 2,402,283 | Hewitt | June 18, 1946 |
| 2,434,464 | Lemonier et al. | Jan. 13, 1948 |

OTHER REFERENCES

"Flight" of April 15, 1943; pages 394, 395.
"Flight" of Dec. 23, 1943; page 693.
"Aviation" of Feb. 1945; page 192.